US006562940B2

(12) United States Patent
Kühn et al.

(10) Patent No.: US 6,562,940 B2
(45) Date of Patent: May 13, 2003

(54) PROCESS FOR THE PREPARATION OF POLYAMIDE GRANULES

(75) Inventors: Frank T. Kühn, Geleen (NL); Rudy Rulkens, Valkenburg (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/946,679

(22) Filed: Sep. 6, 2001

(65) Prior Publication Data

US 2002/0032305 A1 Mar. 14, 2002

Related U.S. Application Data

(63) Continuation of application No. PCT/NL00/00178, filed on Mar. 17, 2000.

(30) Foreign Application Priority Data

Mar. 22, 1999 (NL) .............................................. 1011637

(51) Int. Cl.⁷ ........................ C08G 69/00; C08G 69/04; C08G 69/28
(52) U.S. Cl. ........................ 528/310; 528/312; 528/322; 528/335; 528/336; 528/480; 528/502; 525/419; 525/420
(58) Field of Search ................................ 528/310, 312, 528/322, 502, 480, 336, 335; 525/419, 420

(56) References Cited

U.S. PATENT DOCUMENTS 3,821,171 A * 6/1974 Beaton ........................ 528/322
4,354,020 A * 10/1982 Rotzoll et al. ............... 528/323
4,757,131 A * 7/1988 Bongers et al. .............. 528/335
4,814,356 A * 3/1989 Bongers et al. .............. 521/56
5,140,098 A 8/1992 Pipper et al. ................ 528/322
5,371,174 A * 12/1994 Warnier et al. .............. 528/335

FOREIGN PATENT DOCUMENTS

| EP | 0 038 094 | 10/1981 |
| EP | 0 254 367 | 1/1988 |
| FR | 2143944 | 2/1973 |
| JP | 61188421 | 8/1986 |

* cited by examiner

Primary Examiner—P. Hampton-Hightower
(74) Attorney, Agent, or Firm—Pillsbury Winthrop LLP

(57) ABSTRACT

The invention relates to a granule and granulate and to a process for the preparation of polyamide granules at least comprising a) polymerizing at least one dicarboxylic acid and at least one diamine until a low-molecular prepolymer powder is obtained;

b) processing the prepolymer powder obtained in step (a) to form granules, with the prepolymer powder being extruded at a temperature, measured under the chosen extrusion conditions, below the melting point of the prepolymer.

The process of the invention allows the production of granules that have a higher granule strength than that according to the state of the art. The process of the invention also produces fewer fines. It is preferred for polyamide-4,6 to be chosen as polyamide.

The granules and the granulate obtained by the process of the invention are particularly suited for post-condensation.

16 Claims, No Drawings

PROCESS FOR THE PREPARATION OF POLYAMIDE GRANULES

CROSS-REFERENCE TO RELATED APPLICATIONS

This Application is a continuation of International Application PCT/NL00/00178, filed Mar. 17, 2000, which designated the U.S. and was published in the English language.

The invention relates to a process for the preparation of polyamide granules at least comprising
  a) polymerising at least one dicarboxylic acid and at least one diamine until a low-molecular prepolymer powder is obtained;
  b) processing the prepolymer powder obtained in step (a) to form granules.

A similar process is disclosed in EP 254367 B1, in which a high-molecular polyamide-4,6 is prepared by liquid-phase polymerisation of 1,4-diaminobutane and adipic acid, flashing the resultant low-molecular polyamide (number-average molecular weight less than 10,000 g/mol) until a fine prepolymer powder is obtained and processing this powder to form granules. Subsequently, the granules are post-condensed until a high-molecular polyamide (number-average molecular weight greater than 10,000 g/mol) is obtained.

In the process according to EP 254367 B1, the prepolymer powder is processed to form granules (step b) by processes whereby the prepolymer powder is compacted by pressing the powder through small openings with the aid of pressure, whereupon the strands so formed are broken or are cut into granules. In particular, the powder is compacted with the aid of what is known as a rotating press. The press consists of a horizontal, flat, perforated mould on which at least two vertical collar wheels rotate. The powder is brought between the wheels, whereupon the powder is pressed into the perforations by the rotating wheels and so compacted to form compact polymer strands. Below the perforated disc, the formed polymer strands are broken by rotating knives into small pieces. In this way, a powder with a mean particle diameter ($X_{50}$) of about 200–300 micrometers is granulated into granules about 1–5 mm long and about 3 mm in diameter. This technique, which is commonly applied in the industry, is characterised in that the strands are formed by the alternate application of pressure and relaxation to the ends of the strands that are nearest to the wheels, caused by rotation of the wheels.

A drawback of the process according to EP 254367 B1 is that the granules have low granule strength, which leads to the formation of fines, defined as particles whose average diameter is less than about 1.4 mm. A high fines content (typically 5–10% by weight on average for industrial processes) leads to a process with low efficiency and causes inter alia dust problems in the further processing and transport of the prepolymer granulate, necessitating for example suitable dedusting facilities. The formation of fine particles, originating from the granule, hereafter referred to as fragmentation, is a measure of the granule strength. It is desirable for a granule to have a high granule strength and so a low degree of fragmentation.

The object of the invention is a process for the preparation of polyamide granules that do not present the aforementioned drawbacks of the process according to the state of the art, in particular a process for the preparation of polyamide granules (granulate) with a higher granule strength than that of the state of the art, as well as the polyamide granules themselves.

Surprisingly, the inventors have found that the desired granules can be prepared by extruding the prepolymer powder obtained from step (a) at a temperature below the melting point of the prepolymer, measured at the chosen extrusion conditions.

Surprisingly, it has also been found that the process of the invention offers a number of additional advantages in comparison with the state of the art. For example, it was found that the prepolymer granulate obtained by the process of the invention contains far fewer fines than the granulate according to the state of the art. It was also established that the prepolymer granulate obtained by the process of the invention has a higher gas permeability and also that the granules had a lower porosity than the granules according to the state of the art.

A remarkable effect was established in the polymerisation of 1,4-diaminobutane and adipic acid to form a high-molecular polyamide containing at least 50% —NH—$(CH_2)_4$—NH—CO—$(CH_2)_4$—CO— units. In EP 254367 B1, in order to obtain a high-molecular polyamide containing virtually equal numbers of carboxylic acid groups and amine groups, a large excess of 1,4-diaminobutane is utilised during the polymerisation step (a). This excess amounts to about 1–3% by weight. Use of a large excess amount of 1,4-diaminobutane has the drawback that relatively large amounts of the relatively volatile 1,4-diaminobutane compound volatilise out of the polyamide during post-condensation of the prepolymer granulate, which as a rule is effected at a temperature of 220–260° C., so necessitating provisions to discharge the large amount of volatile compounds from the process. If too small an excess of 1,4-diaminobutane is employed, the polyamide obtained will contain an excess amount of carboxylic acid groups. An excess of carboxylic acids is highly undesirable in that, in the further processing of the post-condensed polyamide, it results in corrosion in the processing equipment, for example extruders and injection moulding machines, in low paintability and in unstable viscosity.

The inventors have found that, by post-condensing the granulate prepared according to the invention under identical conditions as in the state of the art, a high-molecular polyamide could be prepared in which there are present virtually as many carboxylic acid groups as amino groups, without using a large excess of 1,4-diaminobutane in step (a), in particular an excess smaller than about 1% by weight.

In the context of this application, low-molecular polyamide means a polyamide with a number-average molecular weight of maximum about 10,000 g/mol, in particular maximum about 5,000 g/mol. In the context of the present application, high-molecular polyamide means a polyamide with a number-average molecular weight of at least about 5,000 g/mol, in particular at least about 10,000 g/mol.

The process is suited for the preparation of all aliphatic and semi-aromatic polyamides in which during the preparation or processing a low-molecular prepolymer powder is formed, in particular during the preparation of the aliphatic polyamides polyamide-4,6, polyamide-4,8, polyamide-4,9, polyamide-4,10, polyamide-4,11 polyamide-4,12 polyamide-4,13, polyamide-4,14 and polyamide-6,6 and the semi-aromatic polyamides and polyamide 6,6/6,T, polyamide 4,6/4,T/4,I, polyamide-9,T, polyamide-12,T and copolyamides of the aforementioned aliphatic and semi-aromatic polyamides. More in particular, the process is suited for the preparation of high-molecular polyamide-4,6. The process is in principle suited for the processing to granulate of any polymer powder whose extrusion properties match those of a polyamide prepolymer powder, in particular a polyamide prepolymer powder as described in the examples.

As extruder use may be made of any type known to one skilled in the art, for example an single-screw type or a double-screw type, for example a counter-rotating type or a co-rotating type. The extrusion time preferably is 0.5–10 minutes. The extrusion pressure preferably is $1.10^6$–$1.5.10^7$ Pa. Good results are obtained with a twin-screw extruder operated with an extrusion time of 1 minute and a pressure of about $5.10^6$–$1.10^7$ Pa. Preferably, the pressure exerted on the extruder contents is not only relatively continuous but also relatively constant so that blockage of the extruder openings is minimised. It was also found that, preferably, in order to minimise blockage in the extruder, there should be no or hardly any dead spaces in the extruder, especially in the extruder head.

The prepolymer powder is preferably compacted in the presence of an amount of liquid. The liquid is preferably chosen from the group of water, methanol and ethanol. The liquid may also be a mixture of one or more liquids, for example a mixture of water and methanol. It is preferred for water to be chosen as the liquid.

The amount of liquid in the powder/liquid mixture is dependent on inter alia the polar character of the liquid, the average particle size and the particle size distribution of the powder, the type of extruder and the extruder settings. However, the amount of liquid can readily be determined by experiment by one skilled in the art. If the amount of liquid is too low, the powder/liquid mixture will have too high a viscosity for efficient processing by the extruder and the extruder may seize up. On the other hand, if the amount of liquid is too high, the viscosity of the mixture will be too low and no solid extrudate will be obtained. Good results are achieved with about 8–35% by weight of water, more preferably 12–18% by weight of water, relative to the weight of the total powder/liquid mixture. Water of crystallisation was taken into account in determining the amount of water.

The prepolymer may also be compacted in the presence of common additives known to one skilled in the art, in particular fillers, for example carbon fibres, glass fibres, glass beads, talcum, mica and wollastonite, flame retardants, impact modifiers, processing aids, for example Teflon, colouring agents, for example pigments, release agents, stabilisers and nucleating agents. This presents the added advantage that a separate compounding step, as often applied on an industrial scale after post-condensation of the prepolymer granules, can be omitted and so a more economical manufacturing process is obtained for high-molecular polyamide.

According to the invention, the prepolymer powder/liquid mixture is preferably extruded at a temperature, measured during extrusion and near the extrusion opening, which is below the boiling point of the liquid. If water is used as the liquid, the extrusion temperature preferably is lower than about 100° C. Heating up of the prepolymer powder can be accomplished almost completely by friction in the extruder, depending inter alia on the extruder type and settings.

The granules and the granulate obtained with the process of the invention are particularly suitable for post-condensation.

The invention is illustrated by the following examples without being limited thereto.

EXAMPLE I and COMPARATIVE EXAMPLE A

A polyamide prepolymer powder (Stanyl®, DSM, the Netherlands) was prepared on an industrial scale by polymerisation of an excess (0.8% by weight) of 1,4-diaminobutane, water and salt of polyamide-4,6 in a closed batch reactor. Following polymerisation, the reactor was drained via a sprayer in a nitrogen environment at atmospheric pressure. The prepolymer powder evolving in the process contained about 5% by weight water.

The powder was compacted in two manners, i.e. via a rotary press (Kahl-pelletizer, M/s Kahl, Germany) (Comparative Example A) and with the aid of a counter-rotating twin-screw extruder (Example I).

Kahl Pelletizer

The powder was moistened and contained about 7–10% by weight water, inclusive of about 3% by weight water of crystallisation. The Kahl pelletizer was operated at a shaft speed (the shaft to which the wheels are attached) of about 60 revolutions/minute. The Kahl pelletizer contained 5 wheels. The flat mould contained a number of conical perforations of about 3 mm in diameter and with an effective channel length of 4 mm. During compacting the temperature increased—solely by friction—to about 70–80° C. No extra heat was added to the powder by for example heating the mould or by adding hot air.

Twin-Screw Extruder

The powder was moistened and contained about 18% by weight water, inclusive of 3% water of crystallisation. The extruder was operated at a pressure of about $1.10^7$ Pa. The moistened powder was extruded at a mass flow rate of 19 kg/hour. The average residence time of the powder in the extruder was 1 minute. During extrusion the temperature increased from about 20° C. (room temperature) to about 92° C., measured in the extruder head with a stem-type thermometer. The extruder head itself was heated to 60° C. The extruder had a length/diameter ratio of 6 and the screw diameter was 63 mm. The extruder speed was 15 revolutions/minute. The breaker plate contained 2×10 openings. The strands were cut behind the breaker plate by a rotating knife.

Post-Condensation

Subsequently, the granulate obtained by the process according to the state of the art and by the process of the invention was post-condensed at a temperature of about 238° C. for about 25 hours. The concentration of terminal groups (—$CO_2H$ and —$NH_2$) was determined by titration.

The concentration of terminal groups as a function of time is represented in Tables 1 and 2. It is clear that the granulate obtained by the process of the invention and then post-condensed contains, on completion of post-condensation, an equivalent amount of terminal groups, as opposed to the granulate obtained by the process according to the state of the art and post-condensed in identical manner, which contains a three-fold excess of carboxylic groups.

EXAMPLE II

The prepolymer powder was extruded as in Example I at a speed of 35 revolutions/minute. The outflow of the product was more non-uniform than in Example I. The mass flow rate was 30 kg/hour.

EXAMPLE III

The prepolymer powder was extruded as in Example I at a speed at an extruder head temperature of 90° C. The product temperature was 120° C. The outflow of the product was more non-uniform than in Example I. The mass flow rate was 7 kg/hour.

EXAMPLE IV

The prepolymer powder was extruded as in Example III. The length/diameter ratio was 14. The physical properties were determined of all prepolymer granules and granulate from Examples I–IV and Comparative Example A, in particular the granule strength on the basis of the degree of fragmentation and the porosity of the granule and the concentration of fines and the gas permeability of the granulate.

Surprising are the significantly better physical properties of the granules and the granulate obtained by the process of the invention, in particular of the granules and the granulate of a polyamide-4,6 prepolymer powder. Therefore, the invention also relates to a polyamide granule that satisfies the following conditions:

a) fragmentation of the granule is less than about 10% by weight and/or
b) porosity is less than about 0.07 ml/g;

and to a polyamide granulate that meets the following conditions:
a) the concentration of particles smaller than about 1.4 mm in the granulate is less than about 5% by weight and/or
b) the gas permeability of the granulate is less than about $25.10^2$ Pa/m.

Fragmentation

Fragmentation is determined by shaking 50 grammes of granulate (average particle size greater than about 1.4 mm) in a steel bowl (Fritsch, Germany) together with 36 steel balls (diameter 15 mm) for 5 minutes at a frequency of 250 revolutions/minute and an amplitude of 15 mm. The degree of fragmentation is equal to the weight proportion of particles smaller than about 1.4 mm evolving during shaking. Fragmentation is a measure of granule strength. A low degree of fragmentation is indicative of a strong granule. The concentration of fines is determined after shaking.

Concentration of Fines

The concentration of particles with average diameter less than about 1.4 mm is determined by sieving an amount of granulate obtained from for example the extruder and subsequent weighing of the size fractions. A low concentration of fines is favourable in terms of for example the effectiveness of the compacting process, Gas Permeability Gas permeability (Pa/m) is determined by measuring the pressure drop which develops when an air current is passed through through a bed of granulate 30 cm high at a flow rate of 137 l/min at ambient conditions. High gas permeability (=low gas pressure drop) is favourable for effective mass and heat transfer in the post-condensation column.

Porosity

Porosity was determined by mercury porosimetry using an AUTOPORE II 9220 (Micromeritics, USA). The total pore volume determined comprises pores with a diameter of between 0.1–70 micrometers. Low porosity is indicative of a compact granule and is favourable inter alia for reducing the rate of evaporation of volatile compounds, for example 1,4-diaminobutane.

TABLE 1

Terminal group balance as a function of post-condensation time for Comparative Example A.
VN: viscosity as viscosity number.

| Time (min) | Temp. (° C.) | VN (ml/g) | amine groups (meq/g) | carboxylic acid groups | carboxylic acid/amine |
|---|---|---|---|---|---|
| 0 | 20 | 11 | 1.05 | 0.95 | 0.90 |
| 40 | 238 | 31 | 0.306 | 0.319 | 1.04 |
| 168 | 238 | 74 | 0.088 | 0.098 | 1.11 |
| 285 | 238 | 92 | 0.066 | 0.079 | 1.20 |

TABLE 1-continued

Terminal group balance as a function of post-condensation time for Comparative Example A.
VN: viscosity as viscosity number.

| Time (min) | Temp. (° C.) | VN (ml/g) | amine groups (meq/g) | carboxylic acid groups | carboxylic acid/amine |
|---|---|---|---|---|---|
| 403 | 238 | 117 | 0.044 | 0.072 | 1.64 |
| 504 | 238 | 130 | 0.038 | 0.063 | 1.66 |
| 1555 | 238 | 179 | 0.019 | 0.047 | 2.47 |

TABLE 2

Terminal group balance as a function of post-condensation time for Example I.
VN: Viscosity as viscosity number.

| Time (min) | Temp. (° C.) | VN (ml/g) | amine groups (meq/g) | carboxylic acid groups | carboxylic acid/amine |
|---|---|---|---|---|---|
| 0 | 20 | 11 | 1.02 | 0.92 | 0.90 |
| 40 | 238 | 53 | 0.157 | 0.110 | 0.70 |
| 140 | 238 | 74 | 0.107 | 0.078 | 0.73 |
| 280 | 238 | 96 | 0.082 | 0.063 | 0.77 |
| 400 | 238 | 111 | 0.067 | 0.054 | 0.81 |
| 1485 | 238 | 163 | 0.036 | 0.032 | 0.89 |

TABLE 3

Physical properties of the granulate according to EP 254 367 B1 (Comparative Example A) and the granulate according to the invention (Examples II–IV)

| Example | Fragmentation (% by weight) | Fines concentration (% by weight) | Gas permeability ($10^2$ Pa/m) | Porosity (ml/g) |
|---|---|---|---|---|
| A | 13.6 | 5–10 | 25 | 0.072 |
| I | 1.0 | 0.9 | 11 | 0.015 |
| II | 1.5 | 1.0 | 13 | 0.015 |
| III | 3.7 | 0.6 | 7 | 0.015 |
| IV | 6.2 | 0.4 | 11 | 0.015 |

What is claimed is:

1. Process for the preparation of polyamide granules at least comprising
   a) polymerising at least one dicarboxylic acid and at least one diamine until a low-molecular prepolymer powder is obtained;
   b) processing the prepolymer powder obtained in step (a) to form granules, wherein the prepolymer is extruded at a temperature, measured under the chosen extrusion condition, which is below the melting point of the prepolymer.

2. Process according to claim 1, wherein the polyamide is chosen from the group of polyamide-4,6, polyamide-4,8, polyamide-4,9, polyamide-4,10, polyamide-4,11 polyamide-4,12 polyamide-4,13, polyamide-4,14, polyamide-6,6, polyamide 6,6/6,T, polyamide 4,6/4,T/4,I, polyamide-9,T, polyamide-12,T and copolyamides of the aforementioned polyamides.

3. Process according to claim 2, the polyamide is polyamide-4,6 or a copolymer of polyamide-4,6.

4. Process according to claim 1, wherein extrusion is effected with an extrusion time of 0.5–10 minutes and with an extrusion pressure of $1.10^6$–$15.10^6$ Pa.

5. Process according to claim 1, wherein extrusion is effected with a twin-screw extruder.

6. Process according to claim 1, wherein the prepolymer powder is extruded in the presence of a liquid.

7. Process according to claim 6, wherein water is chosen as the liquid.

8. Process according to claim 7, wherein the powder is extruded in the presence of 12–18% by weight water.

9. Process according to claim 6, wherein the extrusion temperature is below the boiling point of the liquid.

10. Process for the polymerisation of 1,4-diaminobutane and adipic acid to form a high-molecular polyamide containing at least 50% —NH—$(CH_2)_4$—NH—CO—$(CH_2)_4$—CO— units, at least comprising
   a) polymerizing 1,4-diaminobutane and adipic acid until a low-molecular prepolymer powder is obtained;
   b) processing the prepolymer powder obtained from step (a) to form granules, and
   c) post-condensing the granules obtained from step (b) until a high-molecular polyamide is obtained,
   wherein the prepolymer powder is extruded at a temperature, measured at the chosen extrusion conditions, below the melting point of the prepolymer and in that an excess of less than 1% by weight 1,4-diaminobutane is applied in step (a).

11. Process according to any one of claims 1–10, characterized in that the prepolymer powder is extruded in the presence of an additive.

12. Process according to claim 11, characterized in that the additive is chosen from the group of fillers, flame retardants, impact modifiers, processing aids, colouring agents, release agents, stabilisers and nucleating agents.

13. Granule or granulate obtained by the process according to any one of claims 1–12.

14. Granule or granulate obtained by the process according to any one of claims 1–12, characterized in that the granule or granulate is post-condensed.

15. Polyamide granule, characterized in that
   a) the degree of fragmentation is less than about 10% by weight and/or
   b) the porosity is less than about 0.07 ml/g.

16. Polyamide granulate, characterized in that
   a) the concencentration of particles smaller than about 1.4 mm is less than about 5% by weight and/or
   b) the gas permeability, measured as a pressure drop, is less than about $25.10^2$ Pa/m.

* * * * *